United States Patent [19]

Knoop et al.

[11] Patent Number: 4,503,575
[45] Date of Patent: Mar. 12, 1985

[54] AUTOMATIC LIQUID CONTROL SYSTEM FOR A CLOTHES WASHING MACHINE

[75] Inventors: Donald E. Knoop, Royalton Township, Berrien County; David W. Mundy, St. Joseph Township, Berrien County, both of Mich.

[73] Assignee: Whirlpool Corporation, Benton Harbor, Mich.

[21] Appl. No.: 446,225

[22] Filed: Dec. 2, 1982

[51] Int. Cl.³ ............... D06F 33/02; D06F 39/02; D06F 39/08
[52] U.S. Cl. ........................... 8/158; 68/12 R; 68/17 R; 68/207
[58] Field of Search ............ 8/158; 68/12 R, 17 R, 68/207; 307/141, 141.4; 137/387; 236/12 R

[56] References Cited

U.S. PATENT DOCUMENTS

| | | | |
|---|---|---|---|
| 3,030,790 | 4/1962 | Davenport et al. | 68/207 X |
| 3,065,618 | 11/1962 | Cobb et al. | 68/12 R |
| 3,086,836 | 4/1963 | Ohmann | 8/158 |
| 3,093,841 | 6/1963 | Cobb et al. | 8/158 |
| 3,470,718 | 10/1969 | Scourtas | 68/12 R |
| 3,478,373 | 11/1969 | McBride et al. | 8/158 |
| 3,478,374 | 11/1969 | McBride et al. | 8/158 |
| 3,498,090 | 3/1970 | Mason | 68/207 |
| 4,144,749 | 3/1979 | Whitmore | 73/149 |
| 4,303,406 | 12/1981 | Ross | 8/158 |
| 4,330,081 | 5/1982 | McMillan | 236/12 R |
| 4,335,592 | 5/1982 | Torita | 68/12 R |
| 4,428,088 | 1/1984 | Getz et al. | 68/12 R X |

FOREIGN PATENT DOCUMENTS 2034927  6/1980  United Kingdom ............ 68/12 R

*Primary Examiner*—Philip R. Coe
*Attorney, Agent, or Firm*—Hill, Van Santen, Steadman & Simpson

[57] ABSTRACT

A liquid control system is provided for an automatic washer which responds to a user's inputs of fabric type, desired temperature and additives required, to introduce into the tub of the washer an optimum volume of liquid to wash a clothes load in the tub, the average temperature of the liquid introduced to the tub being adjusted to compensate for the thermal effects of the tub. The selected additives are dispensed in a diluted form in the proper amounts during the filling operation.

29 Claims, 13 Drawing Figures

AUTOMATIC LIQUID CONTROL SYSTEM FOR A CLOTHES WASHING MACHINE

BACKGROUND OF THE INVENTION

1. Field of the Invention

This invention relates to an automatic liquid control system for a clothes washing machine and more specifically for an automatic liquid level control system, liquid additive dispensing control system and a liquid temperature control system for a washing machine.

2. Description of the Prior Art

Various methods have been proposed in the past for controlling the amount of liquid added to a clothes washing machine to provide an optimum amount of wash liquid, and there have also been various methods proposed to control the temperature of the liquid added to arrive at a final desired temperature of the wash liquid.

U.S. Pat. No. 3,086,836 discloses an automatic liquid level control wherein a given volume of liquid is added to the clothes load, the volume not absorbed by the clothes load is measured, and that measurement is utilized to determine the additional volume of liquid to be added to obtain the proper total amount of liquid. U.S. Pat. No. 3,478,373 provides an automatic liquid level control which responds to the flow of liquid in a predetermined flow path to sense when the proper amount of washing fluid is present in the tub of the washer. U.S. Pat. No. 3,478,374 provides for an automatic liquid level control in an automatic washing machine which involves employing a sensing zone in proximity to the axis of the agitator, applying a reduced pressure at the sensing zone, and then introducing additional amounts of liquid into the machine when the liquid has been depleted from the sensing zone as a result of an excessive amount of wash fabric being present in comparison to the amount of washing liquid. U.S. Pat. No. 3,498,090 utilizes a control system for use in automatic washers to automatically control the quantity of liquid added to the machine's tub during the wash and rinse operations by using a torque signal generated in the machine by action of the agitator.

U.S. Pat. No. 4,330,081 provides a water temperature control system for a clothes washing machine in which the temperature of the incoming mixed hot and cold water is periodically sensed, and the accumulative average temperature of the mixed water is compared to a desired temperature value stored in the memory of a microprocessor. When the comparison results in a temperature difference which exceeds a predetermined error limit, the appropriate hot and/or cold water valves are turned off or on causing the average temperature of the mixed water to change toward the desired temperature value.

SUMMARY OF THE INVENTION

The present invention provides for an automatic washer which includes an automatic water level control which is responsive to various parameters selected by a user of the washer. A load of clothes of a known fabric type is placed in the washer basket and the user operates the washer controls to select the appropriate wash cycle for the fabric type of clothes load to be washed, such as "regular heavy", "permanent press" or "knits gentle", etc. The washer is then operated through the washer controls to place the washer basket in a slow spin mode of operation with recirculation of the wash liquid but no pump-out. At this time the agitator is not oscillated but slowly spins with the basket.

The washer controls then operate automatically to turn on a water valve so that a flow of hot, mixed hot and cold or cold water enters the basket. The clothes load is slowly spun in the washer while water enters the basket and wets the clothes load. The clothes are thoroughly wetted by the incoming recirculated water and the clothes load absorbs some of the water. The incoming water volume is continuously measured by a pressure transducer for an initial time period until a minimum level sensor pressure switch associated with the washer tub closes, signalling that a volume of liquid plus clothes load has been received in the washer. This volume is received and stored in a microprocessor portion of the washer control. The basket spin and liquid recirculation mode are automatically terminated by operation of the washer controls.

The water fill continues with water volume being continuously measured by the pressure transducer until the total volume of liquid in the washer reaches a pre-computed desired volume, providing the desired amount of liquid for optimum washing performance for the clothes load in the washer. This volume is determined by computation from the initial minimum level volume, the fabric type, and a stored table of optimum volumes. The microcomputer provides a signal to the washer control so that the washer then proceeds into the selected wash cycle.

The automatic water temperature control is also responsive to parameters selected by the user. The user may enter the desired wash temperature directly in degrees or indirectly as cold, warm, hot, etc. An initial tub temperature is measured automatically and the microcomputer initially turns on water valves in accordance with the temperature range selected. When the tub pressure switch is activated at the minimum liquid volume level, the inlet valve is switched to either hot or cold depending on whether the average water temperature at that time is below or above the desired temperature. When the temperature of the water in the tub reaches the desired temperature the opposite inlet valve is selected. This continues until the point at which the switching to the opposite inlet valve will cause a water temperature to be approximately met when the required final volume is met.

An automatic additive dispensing arrangement is also provided to allow a user to fill containers in the tub periodically and not to take the time or effort of pouring, measuring and filling dispensers for each wash cycle. The additive dispensing takes place while wash liquid is flowing in a recirculation mode, from a pump and filter, through a two-way valve to a mixing tank and out through a recirculation outlet to the tub. Liquid fill in the mixing tank is terminated when a minimum level sensor trips, trapping liquid in the mixing tank. A metering valve is opened for a time in proportion to the amount of additive required. An additive solenoid actuated valve is opened until the level sensor in the mixing tank trips. Wash liquid from the tub is then permitted to circulate through the mixing tank which results in the contents of the tank being flushed into the tub.

DESCRIPTION OF THE PREFERRED EMBODIMENTS

Figure 1:
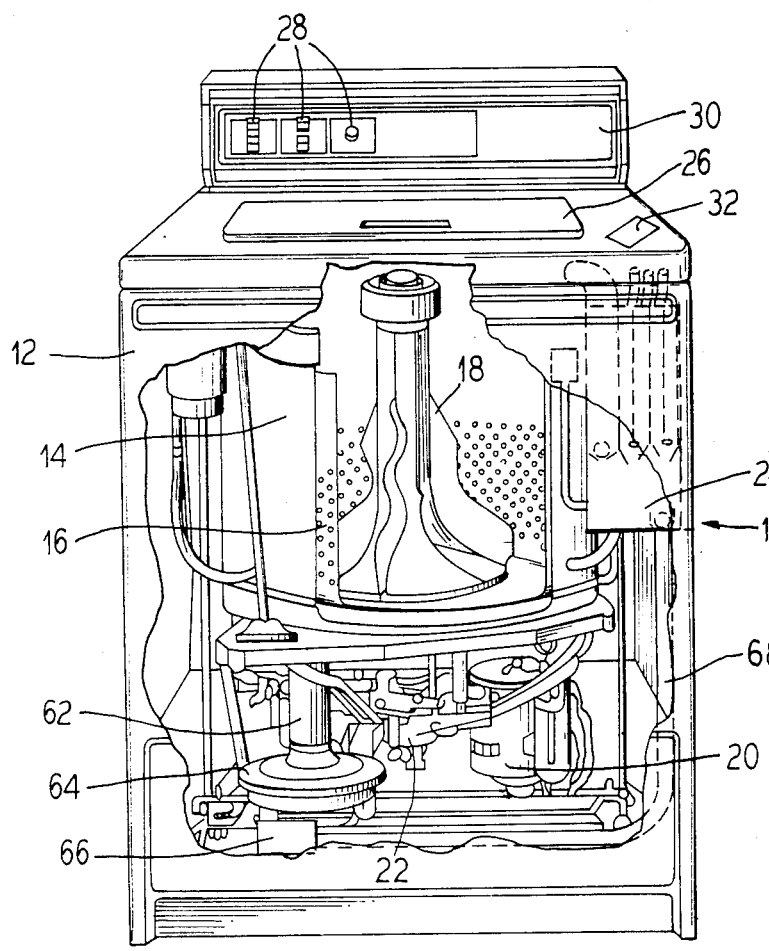
FIG. 1 is a perspective view of a vertical axis automatic washing machine partially cut away to show the interior workings thereof and containing the invention of the present application.

In FIG. 1, an automatic washing machine is shown generally at 10 comprising a cabinet or housing 12, an imperforate tub 14, a concentrically mounted basket 16 with a vertical agitator 18, a water supply (not shown), an electrically driven motor 20 operably connected via a transmission 22 to the agitator 18 and an additive dispensing system 24.

An openable lid 26 is provided on the top cabinet 12 for access into the basket 16 and controls 28 including a pre-settable sequential control means for use in selectively operating the washing machine through a programmed sequence of washing, rinsing and drying steps are provided on a console panel 30. A second openable lid 32 provides access to the additive dispensing system 24.

Figure 2:
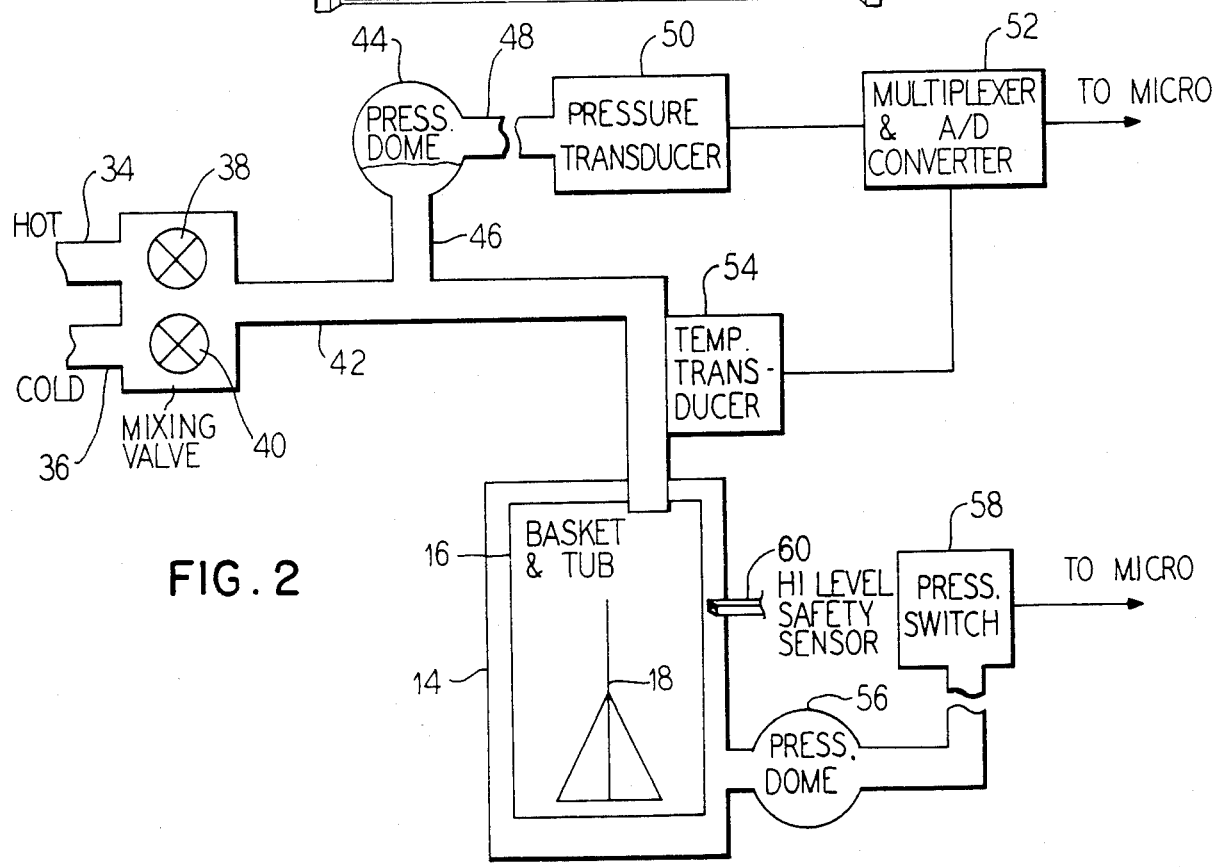
FIG. 2 is a schematic diagram showing a means for automatically filling the tub to a desired level with wash liquid of a desired final temperature.

FIG. 2 is a schematic diagram showing a means for automatically filling the wash tub 14 to a desired level with wash liquid of a desired final temperature. There is a hot water supply 34 and a cold water supply 36 which direct water to pass through mixing valves 38 and 40 to flow into water fill conduit 42. The mixing valves 38 and 40 are operated automatically by the washer controls in response to the temperature parameter selected by the user when operating controls 28 and in response to the measured temperature of wash liquid which has previously entered the tub 14.

During the filling operation the amount of wash liquid entering the tub is continuously monitored by the utilization of a pressure dome 44 which is connected directly to the fill line 42 by tube 46. Liquid passing through the fill line 42 compresses and pressurizes air trapped in the pressure dome. The pressure dome is connected by a second tube 48 to a pressure transducer 50 such as Micro Switch Model 142PC05D which compares the air pressure in the dome 44 to atmospheric air pressure on a pressure diaphragm. A voltage corresponding to the difference is developed by the pressure transducer. This analog voltage is monotonic with water flow rate but not linear.

Figure 4:
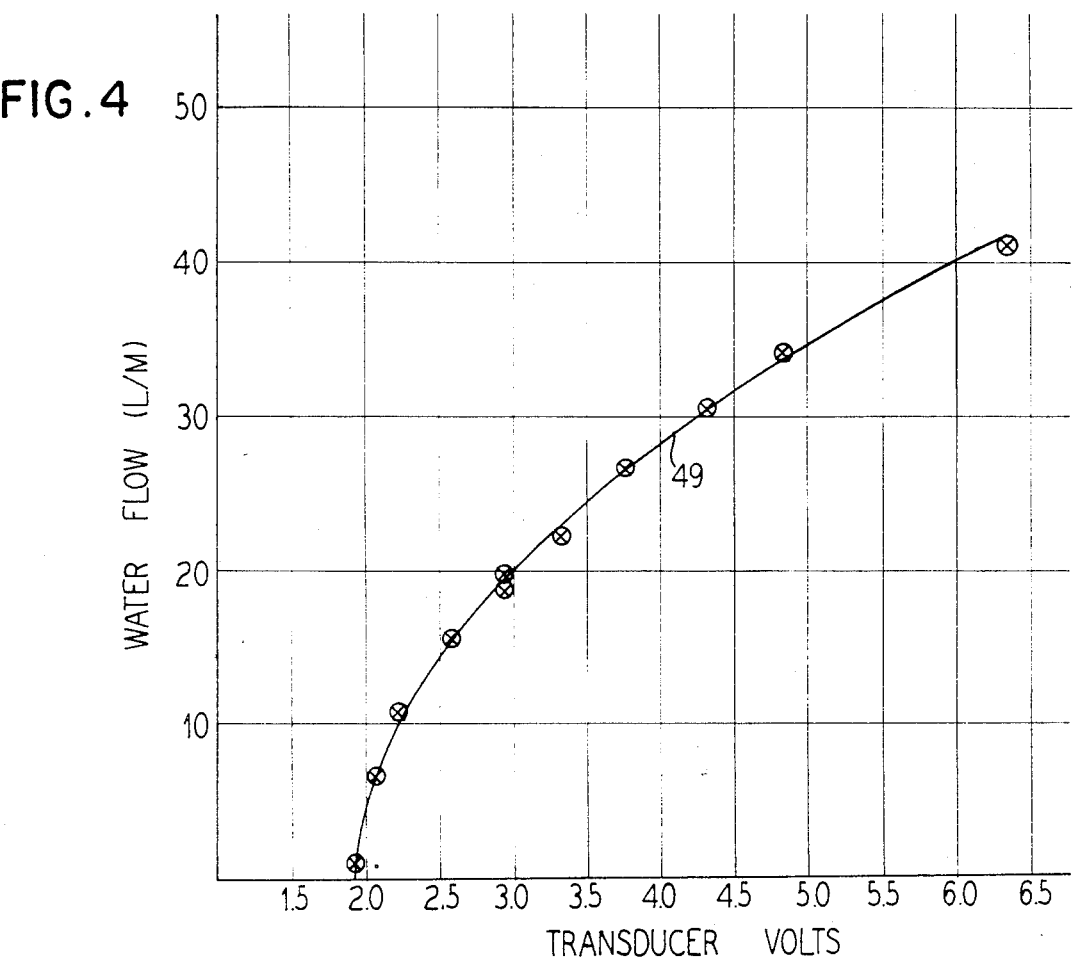
FIG. 4 is a chart showing the relationship of water flow and transducer voltage which is utilized in determining the amount of liquid added to the washer tub.

FIG. 4 is a chart which shows the relationship of water flow through the fill line 42 and transducer voltage. A microcomputer can be utilized to linearize the curve designated by reference numeral 49. This curve is determined experimentally. The flow rate can be sampled at regular time intervals, say $\Delta T$, then the instantaneous volume of water can be computed by:

$$V_n = \sum_{i=1}^{n} f_i \Delta T,$$

where $V_n$ is the water volume at time $n\Delta T$ and $f_i$ is the volumetric flow rate at the ith sample time.

This method of flow measurement is advantageous in that there are no moving parts (except for the small deflection of the pressure diaphragm in the pressure transducer) and the absence of any contact with the water (i.e., water pressure is converted to air pressure which contacts the sensor). Therefore, this method provides reliability without concern for mechanical failure or corrosion problems.

The analog voltage produced by the pressure transducer 50 is selected by the multiplexer portion of multiplexer & A/D converter 52 and changed to a digital signal by the analog-to-digital portion. This digital signal is then sent to the microprocessor for conversion into a water flow rate.

As the water continues to flow through the fill line 42 it passes a temperature transducer 54 which measures the incoming temperature of the water as it passes through the fill line 42 before it enters the washer tub 14. The temperature transducer 54 can also be used to measure an estimated initial temperature of the tub 14 prior to the entry of any water through fill line 42. (A more precise but probably more expensive method would employ a second temperature transducer mounted directly on the tub.) This initial tub temperature is stored for later use. The temperature of water entering the tub results in an analog voltage reading which is selected by the multiplexer portion of multiplexer & A/D converter 52 and converted to a digital signal by the analog-to-digital converter portion of 52. This digital signal is then passed on to the microcomputer where the periodic temperature readings are used to calculate the average temperature of the water which has entered the washer tub 14. This computed figure is used in decision steps resulting in the opening or closing of valves 38 and 40.

Another pressure dome 56 is connected with the interior of the tub 14 near the bottom thereof to determine when a minimum liquid volume corresponding to a pre-determined liquid level is achieved within the tub 14. At the minimum level, the pressure within the pressure dome 56 operates a pressure switch 58 which sends a signal to the microcomputer. This minimum level signal is used to establish a point in time for measuring the water volume and water temperature in the tub which are used in later calculations to determine the final water and temperature mix required to arrive at the preselected final water temperature and a computed optimum water volume for washing the clothes load.

A high level safety sensor 60 is also mounted in the tub wall to terminate the filling process if the water fill has not been terminated prior to reaching the level of the sensor.

Figure 2A:
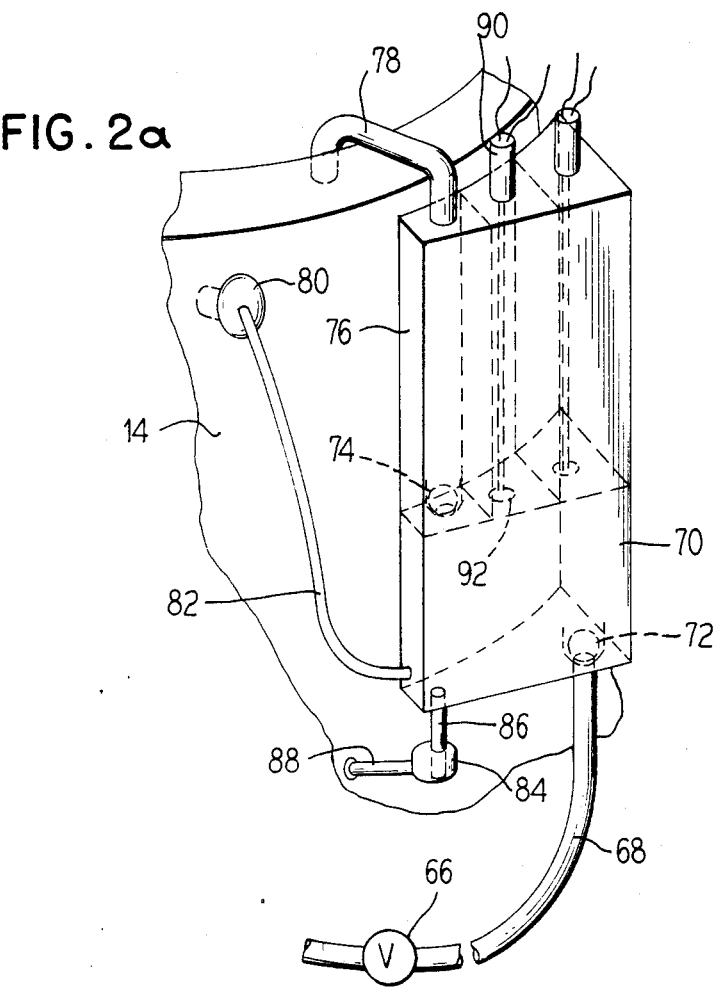
FIG. 2a is a perspective view of the liquid additive dispensing apparatus which is attached to the tub of the washer.

FIG. 2a shows the liquid additive dispensing apparatus 24 which is attached to the tub 14. During the filling operation of the wash cycle the wash liquid flows in a recirculation mode by passing through a pump 62 as seen in FIG. 1 through a filter 64 and a two-way valve 66, also seen in FIG. 2a, to flow through a recirculation hose 68 into a mixing tank 70. A ball check valve 72 is provided to prevent wash liquid from returning into the recirculation hose 68 if the flow through the hose is terminated.

The wash liquid fills the mixing tank 70 and flows through a second ball check valve 74 into a chamber 76 which communicates with a recirculation outlet 78 which in turn communicates with the interior of the wash tub 14. Thus, the recirculation of the wash liquid passes the liquid through the mixing tank 70 and out through recirculation outlet 78 into the tub 14. After terminating the spin/recirculation mode of the filling process when a minimum level sensor trips, the liquid in the mixing tank 70 is trapped since the check valves 72 and 74 close due to downward liquid pressure. Therefore, a known quantity of water is retained in the mixing tank 70.

A metering valve 84 communicates through a conduit 86 with the bottom of the mixing tank 70 and through a conduit 88 with the interior of the wash tub 14. The metering valve 84 drains the mixing tank into the tub at a known rate. The valve 84 is opened for a time in proportion to the amount of additive required. For instance, at a flow rate of 1 ml/sec, 20 sec would be needed to drain 20 ml of water to make room for 20 ml of additive.

After the required amount of liquid is drained from the mixing tank, an additive solenoid 90 is actuated which opens a valve 92 in the bottom of an additive storage tank 94. The additive solenoid 90 holds the valve 92 open until a pressure switch 80 connected to the mixing tank 70 by a tube 82 trips signalling that the liquid level in the tank has returned to the initial trapped volume. If more than one additive is desired in this stage of the wash cycle, additional additives can be added in the same manner. At this point, the spin/recirculation mode is resumed with the valve 66 in the recirculation position. Wash liquid flows through recirculation tube 68 which causes the liquid in mixing tank 70 to pass through chamber 76 and out through recirculation outlet 78 into the tub 14. Therefore, the additive is flushed into the tub interior and is diluted and mixed prior to entering the tub. Additional additives may be added throughout the wash cycle in a similar manner.

Figure 3:
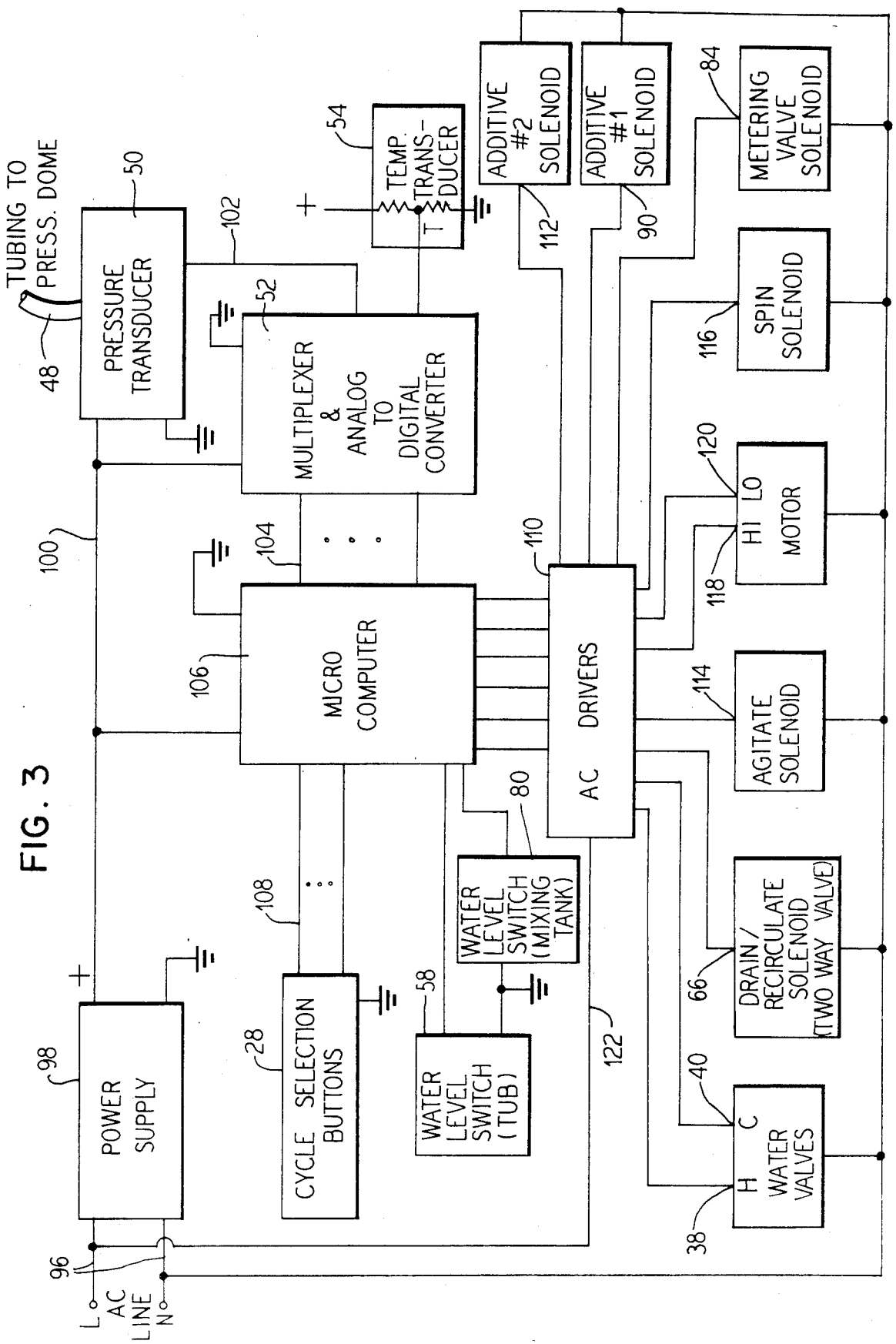
FIG. 3 is a schematic diagram of the circuitry utilized in the device embodying the present invention.

FIG. 3 shows a schematic diagram of the electrical circuitry utilized in the washer embodying the present invention. Normal household alternating current is supplied by AC line 96 to a power supply 98 which converts the alternating current into direct current. The pressure transducer 50 receives electrical energy from the power supply from line 100 and passes an analog voltage along line 102 to the multiplexer and analog-to-digital converter 52. The digital signals from the converter 52 are passed along lines 104 to a microcomputer 106 such as Texas Instruments TI990. There are several lines connecting the converter 52 to the microcomputer 106 which correspond to the number of bits (binary digits) used by the converter. The various cycle selection buttons which comprise the controls 28 on the console 30 of the washer are connected by lines 108 to the microcomputer to provide input signals. The temperature transducer 54 also provides an analog signal to the multiplexer and converter 52 which, in turn, is passed on in a digital form to the microcomputer 106.

The liquid level switch 58 which measures the level of liquid within the tub and the liquid level switch 80 which measures the level of liquid in the mixing tank 70 also provide input signals to the microcomputer 106.

The input signals are used by the microcomputer to produce output signals in response to a program contained in the microcomputer to operate various AC drivers 110 which in turn operate various solenoids for the operation of different functions connected with the washing cycle. Specifically, the water valves 38 and 40, the drain/recirculate two-way valve 66, the metering valve 84, the first additive solenoid 90 and a second additive solenoid 112 are operated by the microcomputer 106 through the AC drivers 110 as described above. The AC drivers 110 also operate an agitate solenoid 114, a spin solenoid 116, and energize the washer motor terminals "high" 118 and "low" 120 to provide high and low motor speeds for control of the washer agitator and basket during various portions of the wash cycle. The AC drivers receive electrical energy along line 122 which is tapped off the AC line 96 prior to conversion by the power supply 98.

Although only two additive solenoids are shown, any desired number of such solenoids and corresponding additive tanks can be utilized depending on the number of additives that a washer is equipped to dispense during the course of a wash cycle.

Figure 6:
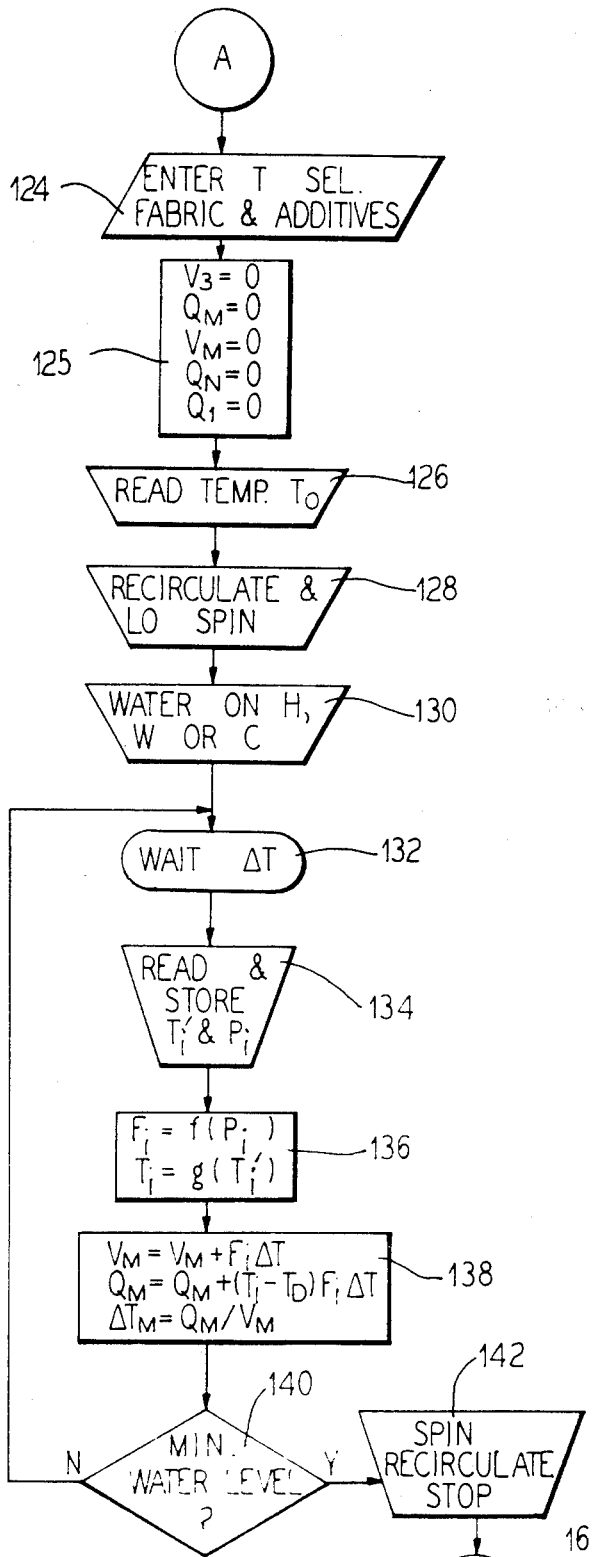
FIGS. 6 through 6d comprise a flow chart for the program carried out by the microprocessor for carrying out the filling and dispensing steps of the present invention.
Figure 6A:
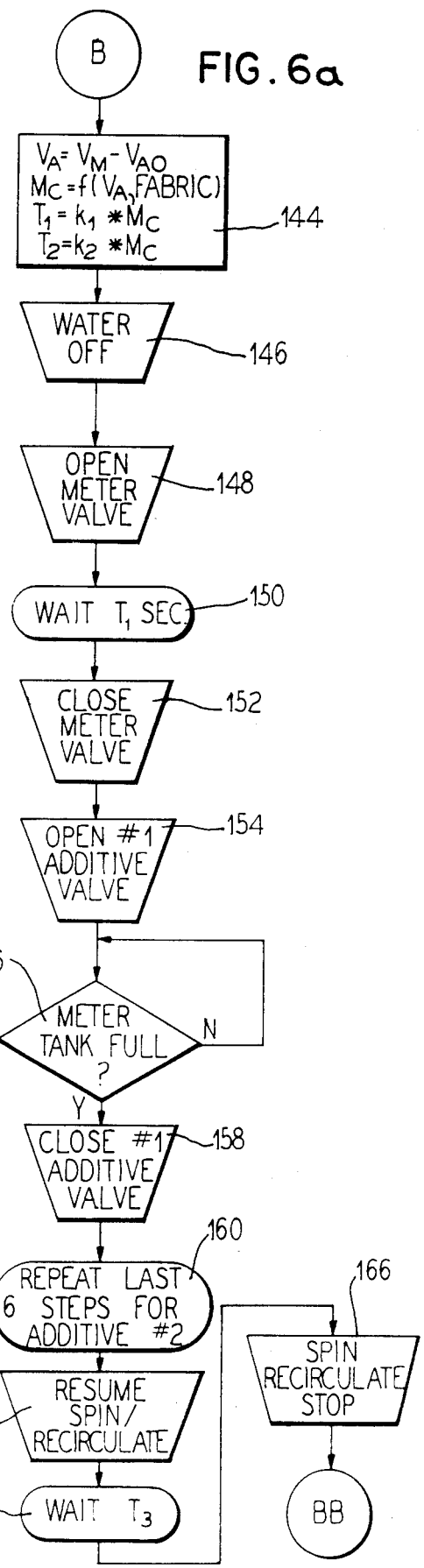
Figure 6B:
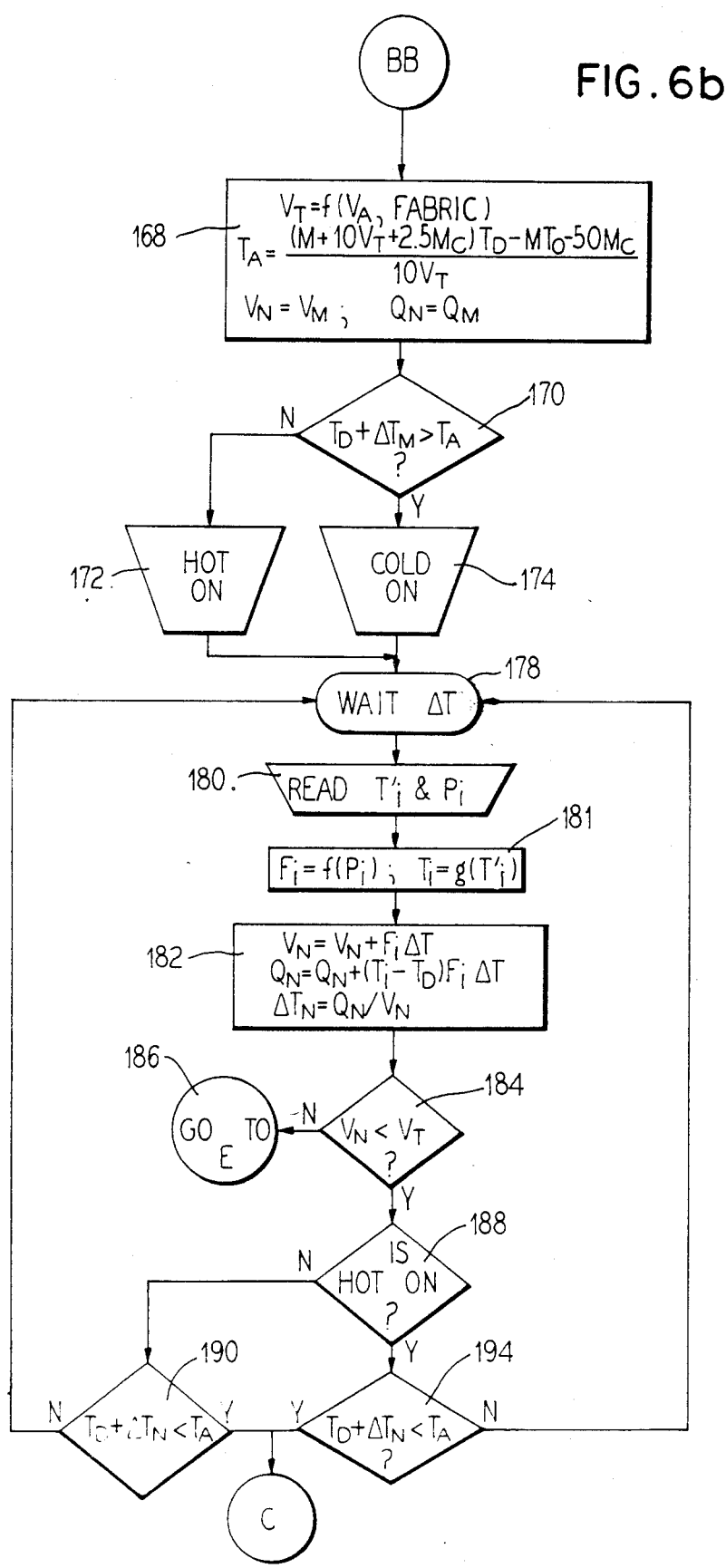
Figure 6C:
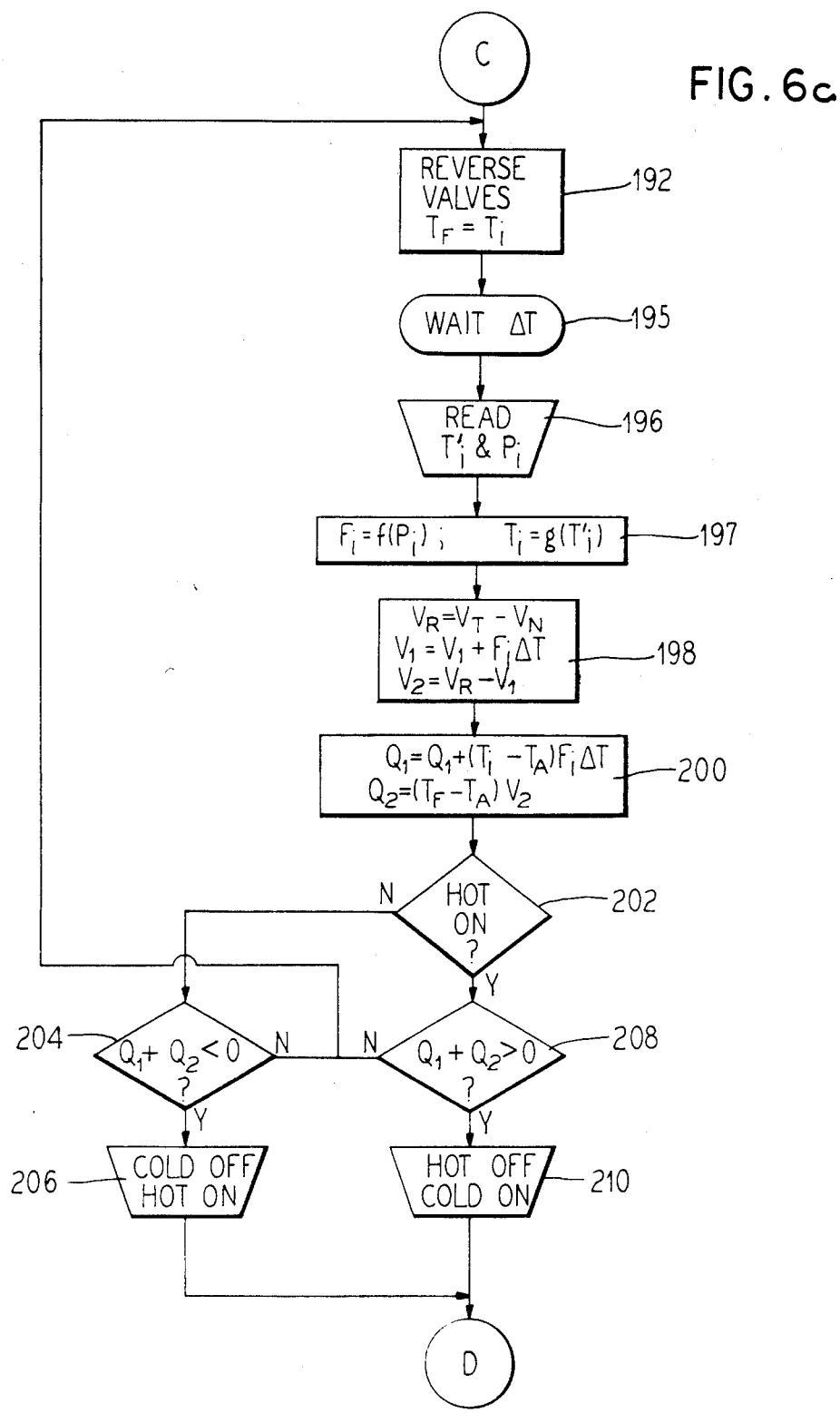
Figure 6D:
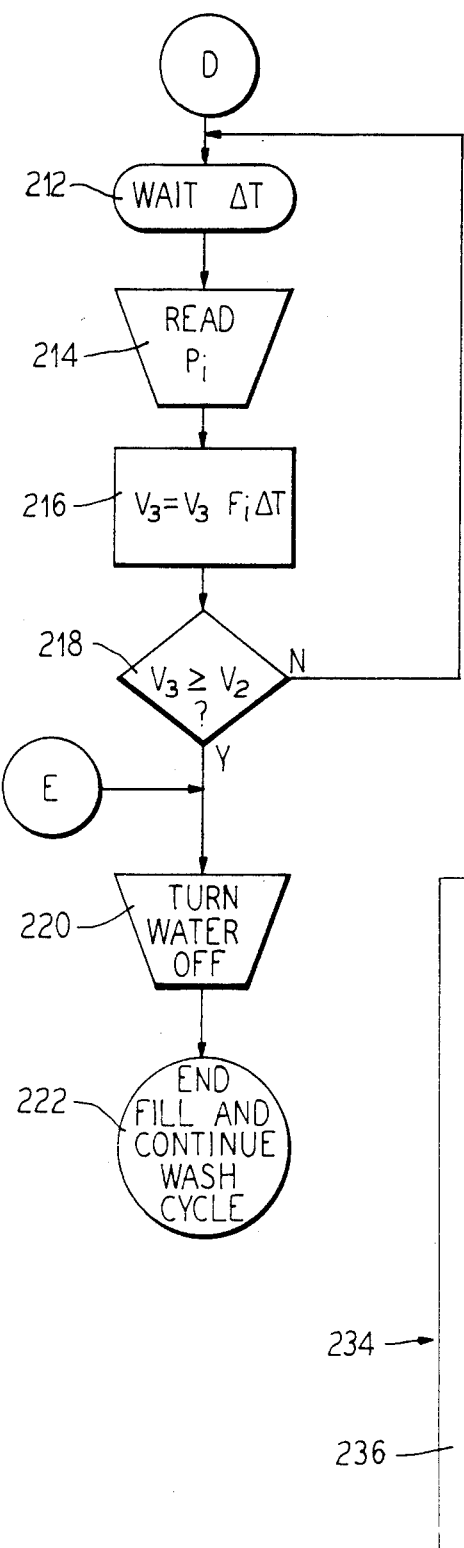

Referring now to FIGS. 6 through 6d which comprise the series of steps in the program which is utilized during the filling operation of the tub at the beginning of the wash cycle, it is seen that the first step designated as control unit 124 is for the user to enter a desired temperature $T_D$ and also to select the fabric type and desired additives. Control unit 125 initializes to zero the values of accumulated heat rise $Q_M$, accumulated water volume $V_M$, new accumulated heat rise $Q_N$, and remaining accumulated heat rise $Q_1$. Control unit 126 reads an initial temperature $T_0$ of the tub 14 by means of the temperature transducer 54. This initial tub temperature is stored in memory for later use.

Control unit 128 directs the operation of the motor and pump to recirculate wash liquid in a low spin mode. Control unit 130 turns the water fill on by operating mixing valves 38 and 40 to provide for hot, warm or cold water to begin filling the tub. Hot water only is supplied if the desired temperature $T_D$ is greater than a preset first temperature $T_1$ which is the top of the warm range. Cold water only is entered if the desired temperature $T_D$ is less than a second preset temperature $T_2$ which is at the bottom of the warm range. If neither of those conditions are met then warm water which is a combination of hot and cold is permitted to enter through the mixing valves 38, 40 and fill line 42.

Control unit 132 causes the program to wait for a specified length of time $\Delta T$ (one second is used in the preferred embodiment). At the end of this time period, control unit 134 causes the reading (selection and conversion) and storage of an instantaneous temperature $T'_i$ and an instantaneous pressure $P_i$. The two values, instantaneous temperature and pressure, are used in control unit 136 to compute an instantaneous temperature $T_i$ and an instantaneous flow rate $F_i$. This step in control unit 136 represents the conversion of the stored values from the pressure transducer 50 and temperature transducer 54 from voltage units to flow rates and temperatures using stored data from FIG. 4 for flow rate and a similar but not shown experimentally derived curve for temperatures.

Control unit 138 calculates various parameters. Specifically, an accumulated water volume $V_M$ is calculated by adding to the previous water volume the calculated instantaneous flow rate $F_i$ multiplied by the time period $\Delta T$ to arrive at a new accumulated water volume. An accumulated heat rise $Q_M$ is calculated by adding to the previous heat rise the difference between the instantaneous temperature $T_i$ and the desired temperature $T_D$ times the new volume of water entered, being the instantaneous flow rate $F_i$ times the time period of $\Delta T$. The average temperature rise per unit of water volume $\Delta T_M$ is calculated by dividing the accumulated heat rise $Q_M$ by the accumulated water volume $V_M$.

Control unit 140 then inquires whether a preset minimum water level has been attained. If the minimum water level has not yet been attained, control is passed back to control unit 132 for a reiteration of the readings and calculation of the temperatures and volumes. If control unit 140 determines that the minimum water level has been attained, then control is passed to control unit 142 which directs the motor to stop spinning the basket and agitator and to stop recirculating the water. This terminates the flow of water through recirculation tube 68 into the mixing chamber 70.

Figure 5:
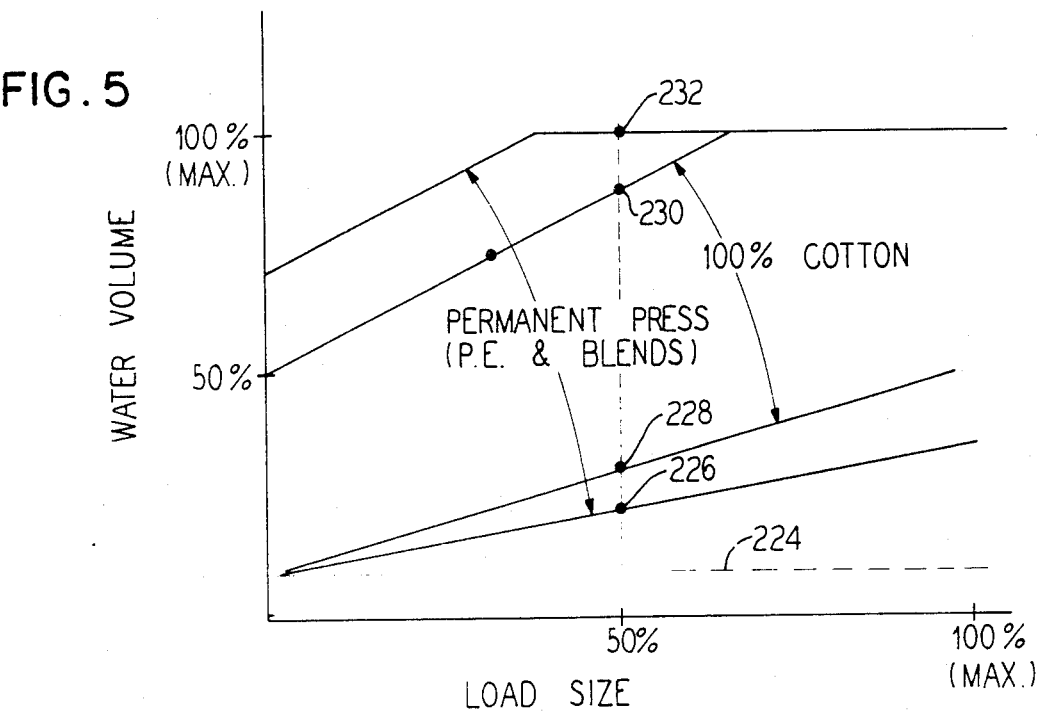
FIG. 5 is a chart which shows the relationship between load size and water level for cotton wash fabrics and permanent press fabrics.

Control is then passed to control unit 144 seen in FIG. 6a where a number of calculations are made. An absorbed volume of water $V_A$ is calculated by subtracting from the volume of water currently in the tub $V_M$ (amount needed to attain minimum level) the volume required to fill the tub to minimum level without a clothes load, $V_{AO}$ which is a predetermined value stored in the microcomputer. The mass or weight of the clothes $M_C$ is calculated as a function of the absorbed volume of water $V_A$ and the fabric selected (according to stored experimental values such as shown in FIG. 5 as discussed below).

The amount of additives to be dispensed is also calculated in terms of the length of time that the metering valve 84 should be opened. Specifically, the amount of additive 1 is calculated by multiplying a constant $K_1$ for additive 1 times the weight of the clothes load $M_C$ (or optionally the volume of water $V_T$ which could be calculated in control unit 144 instead of 168) to arrive at a first time interval $T_1$. The amount of additive 2 is calculated in a similar manner and if additional additives are to be dispensed into the wash tub, the amounts would be calcaulated similarly.

Next, control unit 146 causes the valves 38 and 40 to close thereby terminating the flow of water into the tub 14. Control unit 148 then opens the meter valve 84 which allows some of the wash liquid in the mixing chamber 70 to return to the tub via conduits 86 and 88. Control unit 150 then causes the system to wait for a period of time $T_1$ which was calculated in control unit 144 corresponding to the length of time required to dispense the proper amount of wash liquid from the mixing chamber which is equal to the amount of additive to be added.

Control unit 152 closes the metering valve 84 and control unit 154 opens the first additive valve 92 by means of activating solenoid 90. Control unit 156 continuously inquires whether the mixing tank has been refilled to the level it was prior to the opening and closing of metering valve 84. Once the mixing tank is full, control is passed to control unit 158 which causes the closing of the first additive valve 92. Control unit 160 then passes control bacl to control unit 148 so that additive 2 may be dispensed into the mixing tank. This sequence of steps can be repeated for any number of additives.

After all of the desired additives have been dispensed into the mixing chamber 70, control then passes to control unit 162 which causes the spin and recirculate mode to resume. Control unit 164 has the program wait for a preselected time period $T_3$ which is sufficient time for wash liquid to be pumped through the mixing tank 70 to provide for the additives in the tank to be flushed through chamber 76 and out the discharge outlet 78 into the tub. At the end of time period $T_3$, control is passed to control unit 166 which causes the spin/recirculate mode to stop.

Referring now to FIG. 6b, several calculations are made in control unit 168. Specifically, $V_T$ which is the total volume of water required for the wash load is calculated as a function of $V_A$, the water absorbed by the clothes, and the fabric type (according to stored experimental values such as shown in FIG. 5 as discussed below). The adjusted final temperature $T_A$ is calculated according to the equation shown in the block using a specific value for M that corresponds to a particular machine as detailed below. The adjusted temperature takes into account the effect of the temperature of the wash tub prior to the addition of any wash liquid and in essence determines the amount of heat needed to compensate for the difference in temperature of the initial tub temperature and the final desired temperature. It also takes into account the wash load which is assumed to be at 20° C. (average room temperature). In the equation of control unit 168, M represents the weight of the tub and basket in contact with the wash liquid, $V_T$ is the final volume of wash liquid, $M_C$ is the weight of the clothes load, $T_D$ is the final desired temperature and $T_0$ is the initial temperature of the wash tub. The current value of $V_M$, the volume of water in the tub, is stored as $V_N$ and the current value of heat quantity $Q_M$ is stored as $Q_N$.

After these calculations have been made, control is passed to control unit 170 where the desired temperature $T_D$ plus the change in the average temperature of the water admitted to the tub $\Delta T_M$ is compared with the calculated adjusted final temperature $T_A$. If the adjusted temperature $T_A$ is larger, then control passes to control unit 172 which turns on hot water only. If the adjusted temperature is smaller, then control passes to control unit 174 where cold water only is turned on.

Figure 4A:
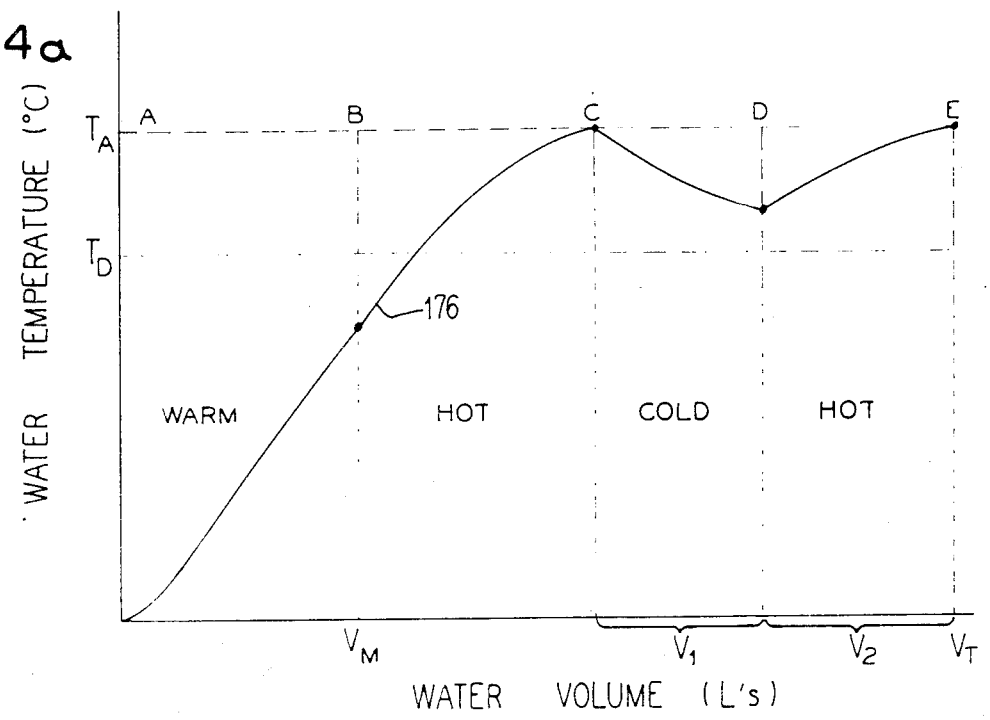
FIG. 4a is a chart which shows the relationship of water temperature and water volume as the wash tub is being filled with wash liquid for a typical fill.

This decision is shown graphically in FIG. 4a which is a chart showing the relationship of the water temperature and water volume as the wash tub is being filled with wash liquid. A curve 176 is drawn representing the temperature and volume of water admitted to the tub. At vertical line B, the water volume in the tub is $V_M$ and the temperature of the water is seen to be below $T_A$. Since the average temperature rise of water $\Delta T_M$ plus $T_D$ is less than $T_A$, hot water only is turned on by control unit 172 which continues the temperature rise as seen on the graph to the right of line B.

Referring back to FIG. 6b, control is passed to control unit 178 which causes a pause for a period of time $\Delta T$. After this pause, control unit 180 again reads an instantaneous temperature and pressure as done in control unit 134. Then the two values, instantaneous temperature $T'_i$ and an instantaneous pressure $P_i$, are used in control unit 181 to compute an instantaneous flow rate $F_i$ and an instantaneous temperature $T_i$. Then various computations are made in control unit 182.

Specifically, a new value for the volume of water in the tub $V_N$ is made, a new value for heat of the water admitted $Q_N$, is calculated and a new average temperature rise $\Delta T_N$ is calculated. Control unit 184 inquires whether the new volume of water in the tub $V_N$ is still less than the total volume of water $V_T$ that is required. If the water in the tub is no longer less than that required then control is passed to control unit 186 which passes control to control unit 220 seen in FIG. 6d which terminates the filling operation.

If the volume of water in the tub is still less than the required total volume then control is passed to control unit 188 which inquires whether the hot valve 38 is open. If the hot valve is not open control passes to control unit 190 which inquires whether the desired temperature plus current average temperature rise are less than the adjusted temperature. If the answer to this inquiry is negative then control is passed back to control unit 178 to repeat the sampling and recalculation process. If the answer to this inquiry is positive then control is passed to control unit 192 shown in FIG. 6c where the positions of the mixing valves 38 and 40 are reversed. Also, the instantaneous temperature $T_i$ is stored as $T_F$.

If the inquiry in control unit 188 of whether the hot valve is open is positive then control passes to control unit 194 which makes the inquiry of whether the desired temperature plus the current average temperature rise is greater than the adjusted temperature. If the answer to this inquiry is negative, then control is passed back to control unit 178 to repeat the sampling and calculation steps. If the answer to the inquiry in control unit 194 is positive then control is passed to control unit 192 which reverses the valves as described above. Control unit 192 also stores the last instantaneous value of liquid temperature ($T_i$) measured to be used in subsequent control blocks.

FIG. 4a illustrates the decision made at this point. At vertical line C, the average temperature of water which has entered the tub has reached $T_A$. The water entering the tub between lines B and C has been hot. When the value of the temperature reaches $T_A$ as at line C, the hot fill water is turned off and the cold fill water is turned on. Thus, the average temperature begins to drop as seen in the graph to the right of line C.

After the valves 38 and 40 have been reversed, control passes to control unit 195 which causes the program to pause for a time period $\Delta T$. Control is then passed to control unit 196 where instantaneous temperature and pressure are again read as in control units 180 and 134. Then the two values, instantaneous temperature $T'_i$ and an instantaneous pressure $P_i$, are used in control unit 197 to compute an instantaneous flow rate $F_i$ and an instantaneous temperature $T_i$. In control unit 198 a series of calculations are made. Specifically, the remaining volume $V_R$ to be fed into the tub is calculated by subtracting from the precalculated total volume $V_T$ the current volume in the tub $V_N$. Next, the additional water volume above volume $V_N$ is accumulated as $V_1$ by adding to the previous $V_1$ the instantaneous flow value times the incremental time period. A final volume $V_2$ is calculated by subtracting from the remaining volume $V_R$ the additional volume $V_1$. This final volume $V_2$ represents the volume of water yet to be put into the tub at the time of the reading.

Control unit 200 accumulates the remaining heat rise $Q_1$ by adding to the previous remaining heat rise the new incremental heat rise. A final heat rise $Q_2$ is predicted by subtracting from the stored temperature $T_F$ the adjusted final temperature $T_A$ and multiplying that value times the calculated final volume $V_2$.

Control unit 202 inquires whether the hot valve 38 is open. If that valve is not open then control passes to control unit 204 which compares the accumulated remaining heat rise $Q_1$ with the predicted final heat rise $Q_2$. When $Q_1 + Q_2$ becomes less than zero then it would be desirable to reverse the valves one more time so that when the total final volume $V_T$ is achieved, the average temperature of the water put into the tub would be $T_A$.

This is shown graphically in FIG. 4a where it is seen that cold water is being admitted into the tub between points C and D which represents the additional volume $V_1$ and then at point D the valves are reversed and hot water only is admitted for the final volume $V_2$ which causes the average temperature of the water admitted to reach $T_A$ when the final total volume $V_T$ is achieved at point E. Thus, as the accumulating remaining heat rise $Q_1$ incrementally diminishes in each succeeding reading and also since the predicted final heat rise $Q_2$ grows during each succeeding reading, once $Q_1 + Q_2$ becomes less than zero, then it is desirable to reverse the valves. This is done by a control unit 206. If the inquiry in control unit 204 is negative then control passes back to control unit 192 and the filling procedure continues.

If the inquiry in control unit 202 is positive then control is passed to control unit 208 which makes the same inquiry as to the accumulated remaining heat rise and the predicted final heat rise. Similarly, as above, if the accumulated remaining heat rise $Q_1$ plus the predicted final heat rise $Q_2$ is greater than zero then control is passed to control unit 210 which causes the valves to reverse. Also, if the inquiry in control unit 208 is negative then control passes back to control unit 192 and the filling procedure continues.

Once the valves have been reversed by either control unit 206 or control unit 210 then control passes to control unit 212 as seen in FIG. 6d which causes the program to wait for an incremental time period $\Delta T$. Control then passes to control unit 214 where the incremental pressure is read. The incremental temperature reading is no longer necessary.

In control unit 216 a final water volume $V_3$ is accumulated by adding to the previous value $V_3$ the incremental volume. In control unit 218 the accumulated final water volume $V_3$ is compared with the final volume $V_2$. If the accumulated value does not equal or exceed the final volume $V_2$ then control is passed back to control unit 212 to continue the accumulation. When the accumulated final volume equals or exceeds the stored final volume $V_2$ then control is passed to control unit 220 which causes the water to be turned off. Control then passes to control unit 222 which concludes the fill portion of the cycle and continues the remainder of the cycle.

Summarizing these steps of temperature control by referring to the chart of FIG. 4a, it is seen that the microcomputer 104 initially turns on both valves 38 and 40 to get warm water flowing into the tub since the desired temperature $T_D$, in this example, is in the warm range. The chart of FIG. 4a shows the initial water temperature selection to be "warm". However, it will be understood that the water temperature selection could also be "hot" or "cold". When the tub pressure switch 58 is activated at the minimum volume level $V_M$, represented by vertical line B, the inlet is switched to hot or cold only depending on whether the average water temperature at that time is below or above $T_A$ respectively, the adjusted set temperature. In the chart of FIG. 4a the temperature is below $T_A$, so hot only is selected until the average water temperature reaches $T_A$ as shown at vertical line C. At that point the opposite valve is selected, that is, cold. This continues until the point at which switching to the opposite valve will cause the water temperature to be approximately met when the required final volume $V_T$ is met. This point is indicated at vertical line D. If the required volume $V_T$ is reached before $T_A$ is reached, the program terminates, resulting in the correct volume with as close a temperature as possible.

This control system minimizes the number of water valve cycles, "off" to "on" and back to "off", to four or less. A possible way to reduce the number of valve cycles to three is to continue at point C the water temperature prior to point C and use the initial water temperature for the final temperature at point D. The equation for $Q_2$ becomes $Q_2=(T_I-T_A)V_2$ where $T_I$=inlet water temperature measured at the end of the initial fill just prior to point B.

FIG. 5 is a chart which shows the relationship between load size and water level for cotton wash fabrics and permanent press fabrics. There is a dashed horizontal line 224 which represents the minimum volume of water $V_{AO}$ when there are no clothes in the washer. When there are clothes in the washer some water is absorbed or carried by the clothes which requires an additional volume of water to be admitted to the tub in order for the sensor 58 to determine that a minimum water level has been achieved. With a 50% load size and permanent press fabrics it is seen that the water volume must increase to a point represented by reference number 226. 100% cotton fabrics require still more water as represented by the point corresponding to reference numeral 228. This additional volume of water has been described as $V_A$ and is calculated in the flow chart in FIG. 6a at control unit 144. The final total volume $V_T$ is calculated at control unit 168 in FIG. 6b as a function of $V_A$ and the fabric type. Volume $V_T$ is also shown on the chart of FIG. 5 where it is seen that the total volume required for a 50% load of 100% cotton is at a point indicated by reference numeral 230 whereas the total water needed for a 50% load of permanent press fabrics corresponds to the 100% maximum amount of wash liquid to be added to the tub at point 232. These curves have been determined from empirical data.

Figure 7:
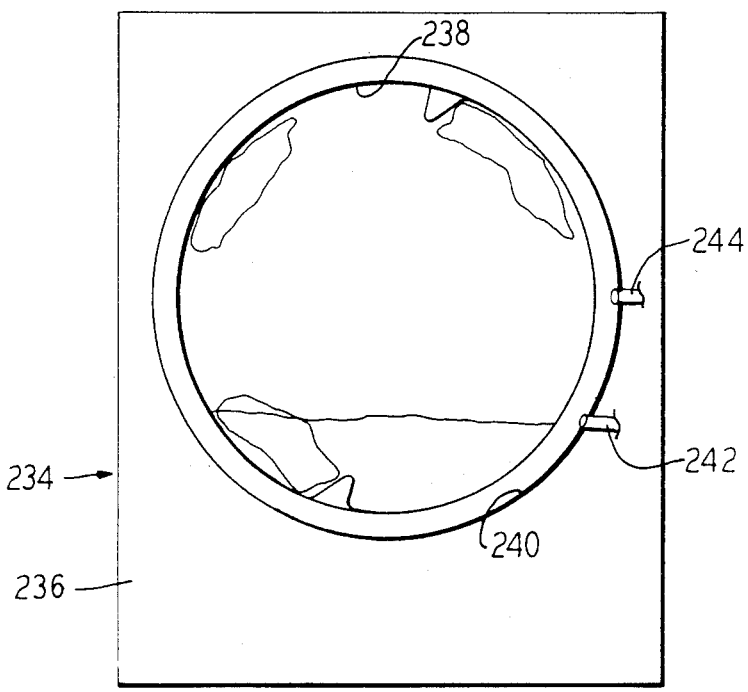
FIG. 7 is a schematic diagram of a horizontal axis washer in which the present invention can also be utilized.

FIG. 7 is a schematic diagram of a horizontal axis washing machine 234 which is comprised of a cabinet 236 having a horizontally disposed tub 238 with a front opening 240. There is a minimum level pressure switch schematically shown at 242 and a high level safety sensor schematically shown at 244. The above description of the program and procedure for filling a washing machine with a calculated optimum volume of water to arrive at a preselected temperature and to automatically dispense a number of wash additives can be implemented in either a vertical type washing machine as shown in FIG. 1 or in a horizontal axis washing machine as shown in FIG. 7.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. An automatic washing machine having a tub to receive washing liquid and a load of clothes to be washed therein including an automatic liquid fill control system comprising:
   supply means for supplying washing liquid to said tub,
   means for continuously determining an incremental input volume of liquid to be supplied to said tub,
   means for adding succeeding incremental volumes of liquid to said tub to achieve an optimum total volume,
   means for determining when an initial liquid depth has been achieved within said tub,
   means for calculating the volume of liquid absorbed by said clothes load when said initial depth of liquid has been achieved,
   means for determing the optimum total volume of liquid required for washing said clothes load from said absorbed volume at said initial depth, and
   means for automatically controlling said supply means for admitting desired volumes of water into said tub.

2. An automatic washing machine having a tub to receive washing liquid and a load of clothes to be washed therein including an automatic liquid fill control system comprising:
   supply means for supplying washing liquid to said tub,
   means for continuously determining an incremental input volume of liquid to be supplied to said tub,
   said means for continuously determining an incremental liquid input volume comprising means for determining an instantaneous fluid flow rate, means for determining an incremental supplying time period and means for multiplying said instantaneous flow rate by said incremental time period,
   means for adding succeeding incremental volumes of liquid to said tub to achieve an optimum total volume,
   means for determining when an initial liquid depth has been achieved within said tub,
   means for calculating the volume of liquid absorbed by said clothes load when said initial volume of liquid has been achieved,
   means for determining the optimum total volume of liquid required for washing said clothes load, and
   means for automatically controlling said supply means for admitting desired volumes of water into said tub.

3. The device of claim 1 wherein said means for determining the optimum total volume of liquid required for washing said clothes load includes means for determining the weight of said clothes load in response to said determination of the volume of liquid absorbed.

4. The device of claim 2 wherein said means for determining an instantaneous fluid flow rate includes means for sampling the pressure of the water entering said tub through a fill line.

5. The device of claim 1 wherein said means for determining when an initial liquid depth has been achieved includes means for sampling the pressure of the liquid exerted against a portion of said tub.

6. The device of claim 1 wherein said means for automatically controlling said supply means includes means for controlling valves in water supply lines connected to said tub.

7. The device of claim 1 including means for inputting fabric type of said clothes load.

8. The device of claim 7 wherein said means for determining the optimum total volume of liquid required for washing said clothes load is dependent on said volume of liquid absorbed and said fabric type.

9. The device of claim 1 wherein said means for calculating the volume of liquid absorbed comprises deducting from the current volume of liquid input, a volume required to be introduced into said tub without any clothes load which would result in said initial liquid depth.

10. An automatic washing machine having a tub to receive a load of clothes to be washed including an automatic additive dispensing control system comprising:
    means for selecting at least one type of additive to be automatically dispensed,
    means for operating said washer in a recirculation mode,
    a mixing chamber,
    means for directing wash liquid into said mixing chamber during said recirculation mode,
    said mixing chamber having an outlet communicating with said tub,
    means for admitting a specific volume of the selected additives to said mixing chamber,
    means for determining the level of wash liquid in said mixing chamber,
    means for terminating said admitting of additives in response to the attainment of a preselected liquid level in said mixing chamber,
    means for resuming said recirculation mode,
    whereby wash liquid will be admitted to said mixing chamber where it will mix with and dilute said additives and will cause said additives to be flushed out of said mixing chamber through said outlet into said tub.

11. The device of claim 10 wherein said means for selecting said additives comprises user operated controls.

12. The device of claim 10 wherein said means for admitting a specific volume of the selected additives includes means for first metering a specific volume of wash liquid out of said mixing chamber, and means for detecting when an original volume in said mixing chamber is restored due to the addition of said additive.

13. The device of claim 10 wherein said means for determining the level of wash liquid in said mixing chamber includes means for sampling the pressure of the wash liquid exerted against a portion of said chamber.

14. An automatic washing machine having a tub to receive a load of clothes to be washed including an automatic liquid temperature control system comprising:
    means for determining an initial temperature of said wash tub,
    means for continuously determining an instantaneous temperature of the liquid entering said tub during an initial filling cycle,
    means for combining succeeding instantaneous temperatures to achieve a current average temperature,
    means for selecting a desired final temperature of the wash liquid in the tub,
    means for calculating an adjusted final average temperature of the liquid being admitted to the tub to account for the thermal effect of the tub which will result in said desired final temperature of the wash liquid in the tub,
    means for determining a final optimum liquid volume to be admitted to the tub,
    means for controlling the temperature of the incoming liquid to result in a final average temperature of said final optimum liquid volume admitted to the tub to be approximately equal to the calculated adjusted final average temperature.

15. The device of claim 14 wherein said means for continuously determining an instantaneous temperature of the liquid entering said tub comprises a temperature transducer operably connected to a water fill line.

16. The device of claim 14 wherein means for selecting a desired final temperature of the wash liquid includes user operated controls.

17. The device of claim 14 wherein said means for controlling the temperature of the incoming liquid includes control means to operate incoming hot and cold water valves in cycles between on and off.

18. The device of claim 17 wherein said means for controlling the temperature of the incoming liquid includes control means that minimizes the number of water valve cycles to no more than four.

19. The device of claim 17 wherein said means for controlling the temperature of the incoming liquid includes control means that minimizes the number of water valve cycles to no more than three.

20. In a machine for liquid treatment of materials comprising:
    a container for receiving said materials,
    means for continuously monitoring liquid flow into said container to update a current volume value,
    means for determining when an initial liquid depth in said container has been attained,
    means for determining the volume of liquid absorbed by said materials at said initial liquid depth,
    means for determining the optimum total volume of liquid required for treating said materials based on said volume of liquid absorbed at said initial liquid depth, and
    means for introducing said total volume of liquid into said container.

21. In a machine for liquid treatment of materials comprising:
    a container for receiving said materials,
    means for determining an initial temperature of said container,
    means for continuously monitoring the temperature of liquid flowing into said container to update a current average input temperature,
    means for selecting a desired final temperature of liquid in said container,
    means for determining the optimum total volume of liquid required for treating said materials,
    means for determining an adjusted final average temperature of the liquid entering the container to compensate for the thermal effect of said container,
    means for introducing said total volume of liquid into said container,
    means for controlling the temperature of incoming liquid to result in a final average temperature of said total volume of liquid added to the container to be approximately equal to the determined adjusted final average temperature.

22. In a machine for liquid treatment of materials having a container for receiving said materials, a liquid control system comprising:
 means for determining an initial temperature of said container,
 means for selecting a desired final temperature of liquid in said container,
 means for continuously monitoring liquid flow into said container to update a current volume value,
 means for continuously monitoring the temperature of liquid flowing into said container to update a current average input temperature value,
 means for determining when a preselected minimum liquid depth in said container has been attained,
 means for determining the volume of liquid absorbed by said materials,
 means for determining the optimum total volume of liquid required for treating said materials,
 means for determining an adjusted final average temperature of the liquid entering the container to compensate for the thermal effect of said container,
 means for introducing said total volume of liquid into said container,
 means for controlling the temperature of the incoming liquid to result in a final average temperature of said total volume of liquid added to the container to be approximately equal to the determined adjusted final average temperature.

23. In a machine for liquid treatment of materials having a container for receiving said materials, a liquid control system comprising:
 means for selecting at least one type of additive to be automatically dispensed into said container,
 means for continuously monitoring liquid flow into said container to update a current volume value,
 means for operating said machine in a liquid recirculation mode,
 means for determining when a preselected minimum liquid depth in said container has been attained,
 means for determining the volume of liquid absorbed by said materials,
 means for determining the optimum total volume of liquid required for treating said materials,
 a mixing chamber,
 means directing said liquid into said mixing chamber during said recirculation mode, said mixing chamber having an outlet communicating with said container,
 means for admitting a specific volume of the selected additives into said mixing chamber, said specific volume being determined based on said optimum total volume,
 means for determining the level of liquid in said mixing chamber,
 means for terminating said admitting of additives in response to the attainment of a preselected liquid level in said mixing chamber,
 means for resuming said recirculation mode, and
 means for introducing said total volume of liquid into said container.

24. In a machine for liquid treatment of materials having a container for receiving said materials, a liquid control system comprising:
 means for determining an intitial temperature of said container,
 means for selecting a desired final temperature of liquid in said container,
 means for selecting at least one type of additive to be automatically dispensed,
 means for continuously monitoring the temperature of liquid flowing into said container to update a current average input temperature value,
 means for operating said machine in a recirculation mode,
 means for determining the optimum total volume of liquid required for treating said materials,
 a mixing chamber,
 means for directing said liquid into said mixing chamber during said recirculation mode, said mixing chamber having an outlet communicating with said container,
 means for determining the volume of wash liquid in said mixing chamber,
 means for terminating said recirculation mode in response to the attainment of a preselected liquid volume in said mixing chamber,
 means for admitting a specific volume of the selected additives into said mixing chamber, said specific volume being determined based on said optimum total volume,
 means for resuming said recirculation mode,
 means for determining an adjusted final average temperature of the liquid entering the container to compensate for the thermal effect of said container,
 means for introducing said total volume of liquid into said container,
 means for controlling the temperature of the incoming liquid to result in a final average temperature of said optimum total volume of liquid added to the container to be approximately equal to the determined adjusted final average temperature.

25. In a machine for liquid treatment of materials having a container for receiving said materials, a liquid control system comprising:
 means for determining an initial temperature of said container,
 means for selecting a desired final temperature of liquid in said container,
 means for selecting at least one type of additive to be automatically dispensed,
 means for continuously monitoring liquid flow into said container to update a current volume value,
 means for continuously monitoring the temperature of liquid flowing into said container to update a current average input temperature value,
 means for operating said machine in a recirculation mode,
 a mixing chamber,
 means for directing said liquid into said mixing chamber during said recirculation mode, said mixing chamber having an outlet communicating with said container,
 means for determining the volume of wash liquid in said mixing chamber,
 means for terminating said recirculation mode in response to the attainment of a preselected liquid volume in said mixing chamber,
 means for admitting a specific volume of the selected additives into said mixing chamber,
 means for resuming said recirculation mode,
 means for determining when a preselected minimum liquid volume in said container has been attained, means for determining the volume of liquid absorbed by said materials, means for determining an adjusted final average temperature of the liquid entering the container to compensate for the thermal effect of said container, means for introducing a total volume of liquid into said container, means for controlling the temperature of the incoming liquid to result in a final average temperature of said total volume liquid added to the container to be approximately equal to the determined adjusted final average temperature.

26. A method of controlling the amount of liquid in a liquid treatment machine comprising:

placing a specific mass of material to be treated in a container in the machine, filling the container with measured volumes of liquid until a predetermined initial depth of liquid in the container is achieved, calculating the volume of liquid absorbed by said material at said predetermined initial depth, calculating the optimum total volume of liquid required for treating said material based on said volume of liquid absorbed at said predetermined initial depth, introducing additional liquid in an amount to achieve said optimum total volume.

27. A method of controlling the temperature of liquid in a liquid treatment machine comprising:

measuring an initial temperature of a liquid container in the machine, selecting a desired final average temperature for liquid to be added to the container, establishing a total volume of liquid to be introduced into said container, determining an adjusted final average temperature of the liquid entering the container to compensate for the thermal effect of the container, continuously sampling the temperature and flow rate of liquid flowing into said container and updating a current average temperature and current volume of said liquid, adjusting the temperature of incoming liquid to result in a final average temperature of said total volume of liquid added to the container to be approximately equal to the determined adjusted final average temperature.

28. A method of automatically controlling the dispensing of additives into a liquid treatment machine comprising:

selecting at least one type of additive to be dispensed, operating said machine in a recirculation mode, circulating liquid in said machine through a mixing chamber, terminating the recirculation mode, metering a specific volume of liquid out of said mixing chamber, dispensing a specific volume of said selected additives into said mixing chamber, continuously measuring the level of liquid in the mixing chamber, terminating the dispensing of said additives in response to the attainment of a preselected liquid volume in said mixing chamber, resuming said recirculation of liquid through said mixing chamber, whereby said additives are dispensed into said liquid treatment machine.

29. A method of controlling the liquid in a liquid treatment machine comprising:

measuring an initial temperature of a liquid container in the machine, selecting a desired final average temperature for liquid to be added to the container, selecting at least one type of additive to be dispensed, placing a specific mass of material to be treated in the container, filling the container with measured volumes of liquid until a predetermined volume of liquid in the container is achieved, calculating the volume of liquid absorbed by said material when said predetermined volume is achieved, establishing a total volume of liquid to be introduced into said container, continuously sampling the temperature and flow rate of liquid flowing into said container and updating a current average temperature and a current volume of said liquid, operating said machine in a recirculation mode to circulate liquid through a mixing chamber, terminating said recirculation mode, metering a specific volume of liquid out of said mixing chamber, calculating a specific volume of said selected additives based on said total volume of liquid, dispensing said specific volume of said selected additives into said mixing chamber, continuously measuring the level of liquid in the mixing chamber, terminating the dispensing of said additives in response to the attainment of a preselected liquid level in said mixing chamber, resuming said recirculation of liquid through said mixing chamber thereby flushing said additive into said container, determining an adjusted final temperature of the liquid entering the container to compensate for the thermal effect of the container, adjusting the temperature of incoming liquid to result in a final average temperature of said total volume of liquid added to the container to be approximately equal to the determined adjusted final average temperature when the total volume of liquid has been introduced into the container.

* * * * *